FILTER FOR BIVALENT PULSE SIGNALS

Filed Nov. 15, 1966 5 Sheets-Sheet 1

INVENTORS
PETER LEUTHOLD
PETRUS J. VAN GERWEN
BY
Frank R. Trifari
AGENT

March 10, 1970 P. LEUTHOLD ET AL 3,500,215

FILTER FOR BIVALENT PULSE SIGNALS

Filed Nov. 15, 1966 5 Sheets-Sheet 2

INVENTORS
PETER LEUTHOLD
PETRUS J. VAN GERWEN
BY
AGENT

INVENTORS
PETER LEUTHOLD
PETRUS J. VAN GERWEN
BY
AGENT

INVENTORS
PETER LEUTHOLD
PETRUS J. VAN GERWEN
BY
Frank R. Trifari
AGENT

FILTER FOR BIVALENT PULSE SIGNALS

Filed Nov. 15, 1966 5 Sheets-Sheet 5

INVENTORS
PETER LEUTHOLD
PETRUS J. VAN GERWEN
BY
Frank R. Trifari
AGENT

United States Patent Office 3,500,215
Patented Mar. 10, 1970

3,500,215

FILTER FOR BIVALENT PULSE SIGNALS

Peter Leuthold, Neuhausen, Switzerland, and Petrus Josephus van Gerwen, Emmasingel, Eindhoven, Netherlands, assignors, by mesne assignments, to U.S. Philips Co. Inc., New York, N.Y., a corporation of Delaware Filed Nov. 15, 1966, Ser. No. 594,615
Claims priority, application Netherlands, Nov. 16, 1965, 6514831
Int. Cl. H03k 1/00
U.S. Cl. 328—61 12 Claims

ABSTRACT OF THE DISCLOSURE

A pulse filter is described, having a pulse source coupling pulses to a shift register, each stage of the shift register being shifted by a control generator connected to the shift register. The control generator has a shift period smaller than the minimum duration of a pulse derived from a pulse source. The shift register stages each include an output attenuation network commonly connected to a device for combining the pulse signals shifted from each shift stage, the output of the combining device being the output of the pulse filter.

The invention relates to a filter for bivalent pulse signals, that is to say pulses which can assume one of two discrete amplitude values, which pulse signals are derived from a separate pulse generator, in particular for use for pulse signals the instants of occurrence of which are marked by a fixed clock frequency, as they are used, for example, in synchronous telegraphy, pulse code modulation, and the like.

In constructing filters for speech and music signals it is sufficient to take into account the amplitude-frequency characteristic, this in contrast with filters for pulse signals in which owing to the difference in nature and character of the said signals to the requirement is also imposed that a linear phase-frequency characteristic must be approached as well as possible. As a result of this additional requirement filters for pulse signals are complicated in structure.

It is the object of the invention to provide a new conception of a filter of the type mentioned in the preamble in which, together with a suitable structure and a construction which is suitable for use in integrated circuits, a desired amplitude-frequency characteristic with an accurately linear phase-frequency characteristic is realized, while in addition the amplitude-frequency characteristic can be adjusted in a simple manner while maintaining its shape and its linear phase-frequency characteristic.

The filter according to the invention is characterized in that it is provided with a shift register connected to the separate pulse generator and comprising a number of shift register elements the contents of which are shifted by a control generator connected to the shift register with a shift period smaller than the minimum duration of a pulse derived from the separate pulse generator; the elements of the shift register being connected, through attenuation networks, to a combination device which combines the pulse signals shifted in the shift register elements each time over a time interval smaller than the minimum duration of a pulse.

In order that the invention may readily be carried into effect, a few examples thereof will now be described in greater detail, by way of example, with reference to the figures, in which.

Figure 1:
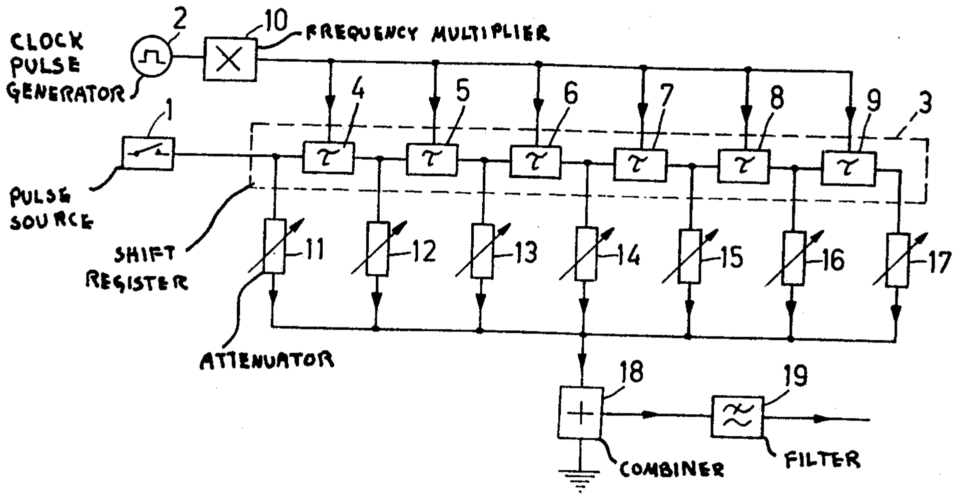
FIGURE 1 shows a filter according to the invention.
Figure 3:
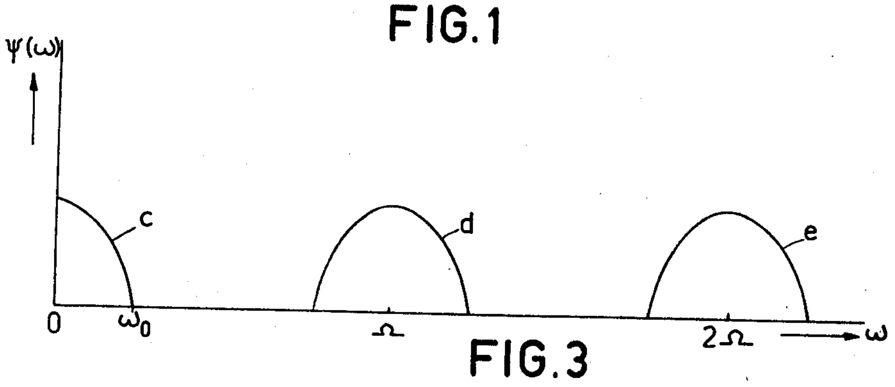
Figure 4:
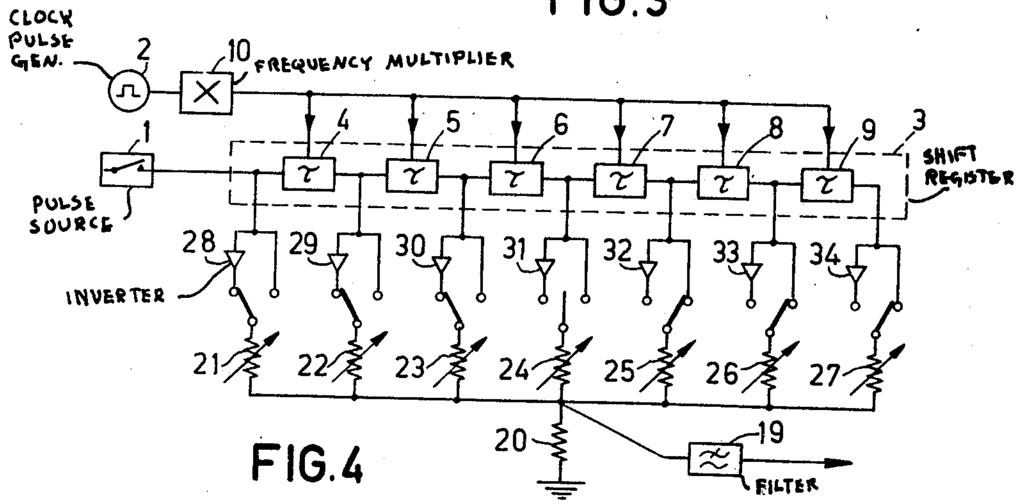
Figure 5:
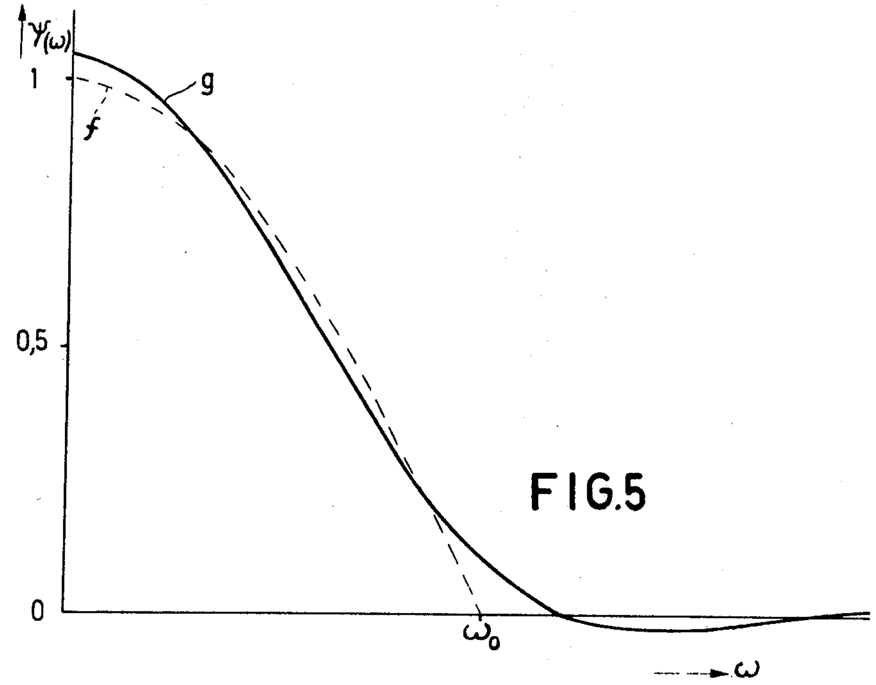
Figure 6:
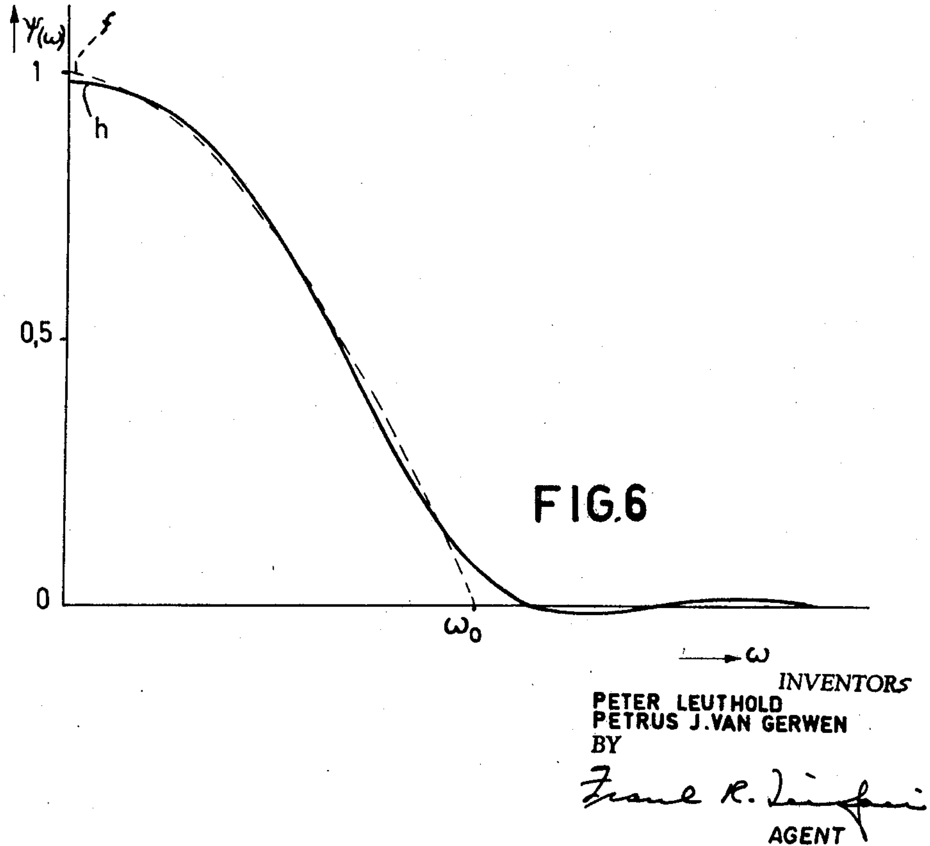
Figure 7:
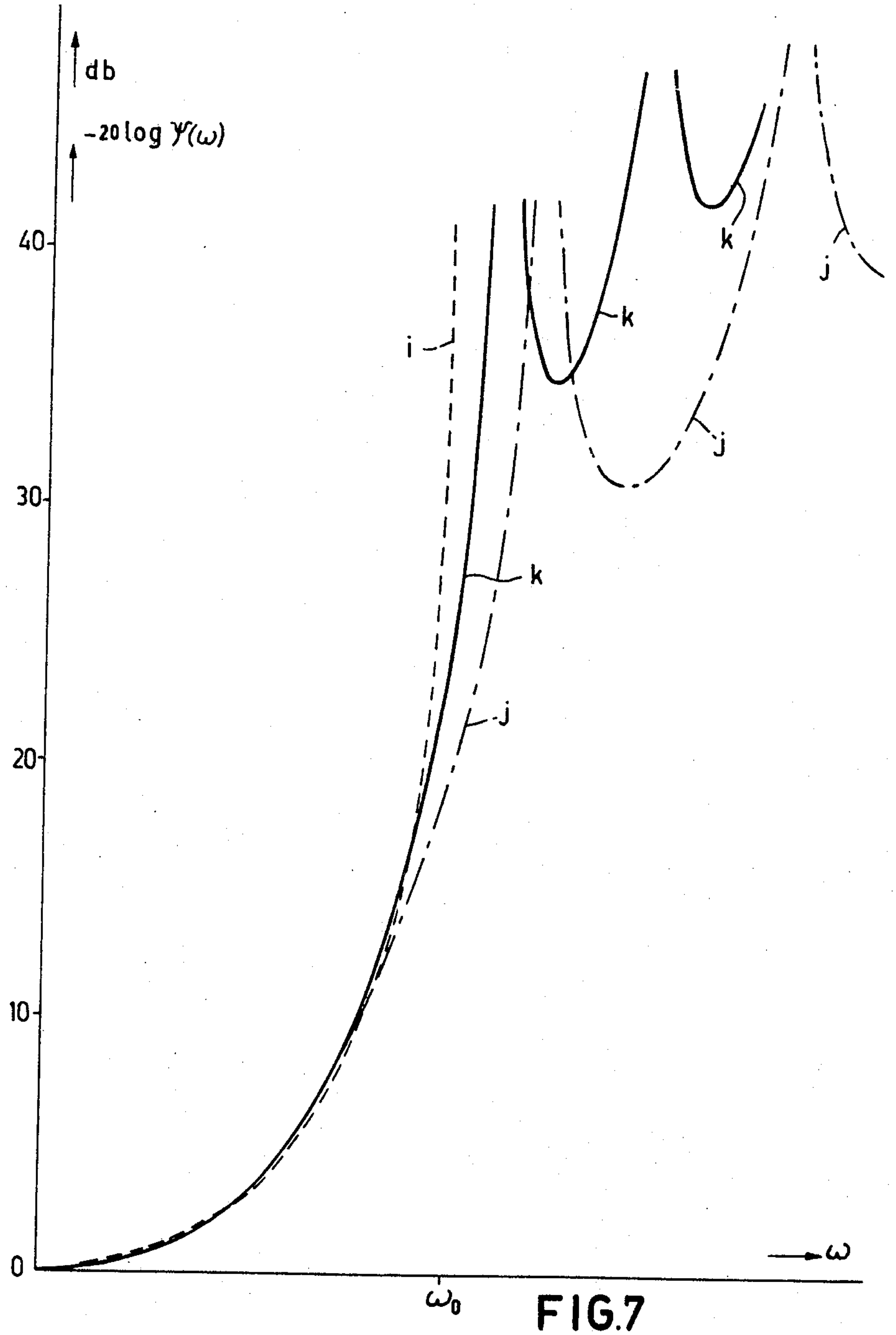
Figures 8, 9, 10:
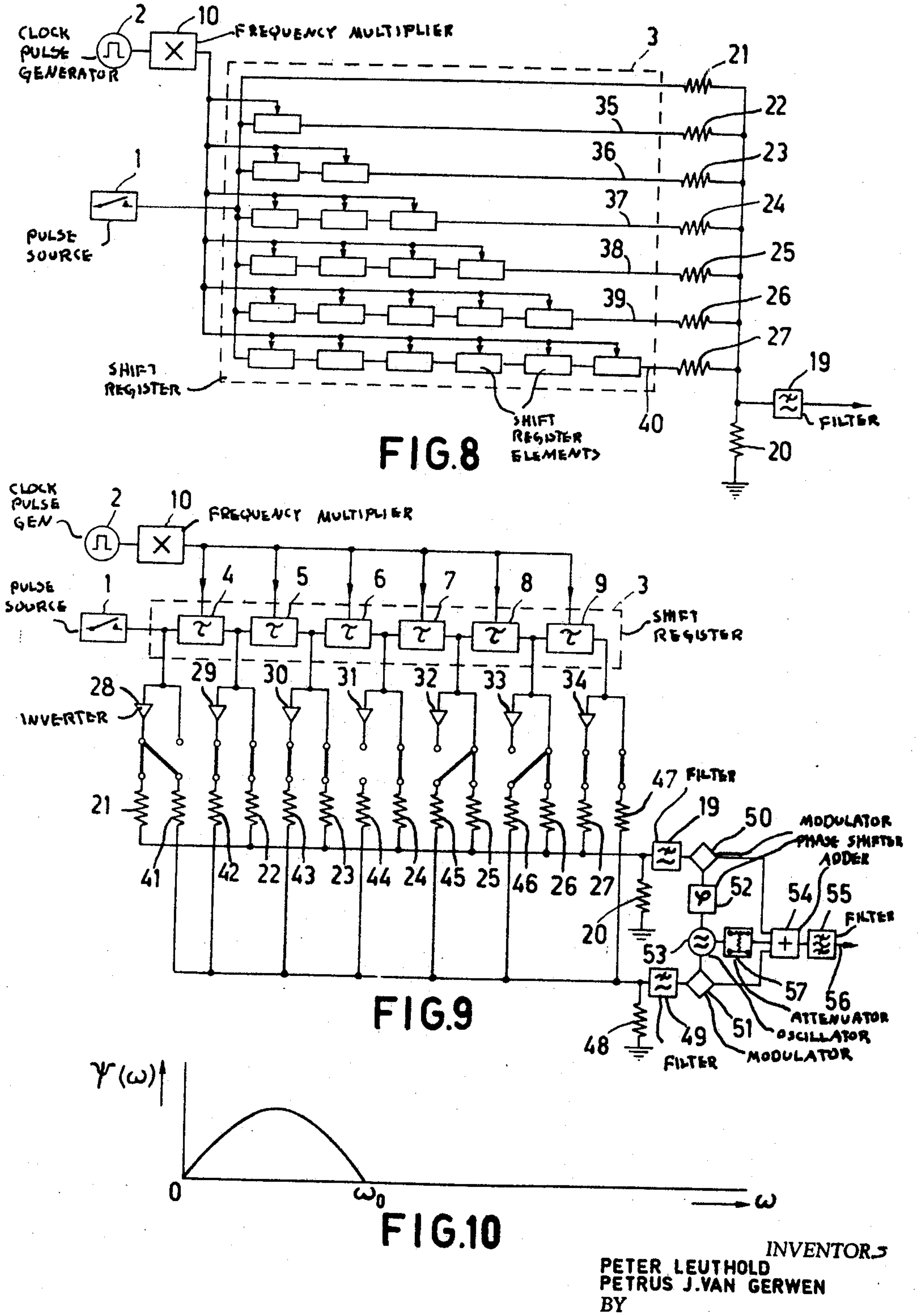

FIGURE 3 an amplitude-frequency characteristic to explain the filter of FIGURE 1;

FIGURE 4 shows an embodiment of a device according to the invention in greater detail;

FIGURES 5 and 6 show a few amplitude-frequency characteristics to explain the device according to the invention; while in FIGURE 7 the attenuation-frequency characteristics are shown corresponding to the FIGURES 5 and 6;

FIGURE 8 shows a variant of the devices according to the invention shown in FIGURE 1 and FIGURE 4;

FIGURE 9 shows a particularly advantageous use of a device according to the invention; while FIGURE 10 shows an amplitude-frequency characteristic to explain the device shown in FIGURE 9.

The pulse filter shown in FIGURE 1 is constructed for bivalent pulse signals originating from a pulse generator 1 the instants of occurrence of which are determined by a fixed clock frequency $\omega_c=2\pi f_c$ which is derived from a clock pulse generator 2. The minimum duration of the signal pulses is, for example, 0.5 msec. and the clock frequency $f_c=2$ kc./s. corresponding to a clock period T of 0.5 msec.

To realize a given filter characteristic the filter according to the invention is provided with a shift register 9 connected to the pulse generator 1, the shift register comprising a number of shift register elements 4, 5, 6, 7, 8, 9 the contents of which are shifted by a control generator 10 connected to the shift register with a shift period $\tau$ smaller than the minimum duration of a pulse derived from the pulse generator 1, the elements 4, 5, 6, 7, 8, 9 of the shift register 3 being connected through adjustable attenuation networks 11, 12, 13, 14, 15, 16, 17 to a combination device 18 which combines the pulse signals shifted in the shift register elements each time over a time interval $\tau$ smaller than the minimum duration of a pulse derived from the pulse generator 1. The shift register 3 consists, for example, of a number of bistable trigger circuits while the control generator 10 of the shift register 3 is constituted by a frequency multiplier which is connected to the clock pulse generator 2 and which supplied control pulses with a period of, for example, 0.05 msec.

In the device shown the bivalent pulses of the pulse generator 1 are shifted with faithful shape through the shift register 3, which can pass only signals having two discrete amplitude values, with the shift period $\tau$ smaller than the duration of a pulse and after attenuation in the attenuation networks 13, 14, 15, 16, 17 combined in the combination device 18. If in this case the transfer coefficients of the attenuation networks 11, 12, 13, 14, 15, 16, 17 are set at suitable values, any arbitrary amplitude-frequency characteristic with linear phase-frequency characteristic can be realized as a result. For that purpose, for example, starting from the ends of the shift register 3, the attenuation networks are made equal in pairs, that is to say, in the embodiment shown the transfer coefficients of the attenuation networks, 11, 17 are both $C_3$, of the attenution networks 12, 16 both $C_2$, of the attenuation networks 13, 15 both $C_1$, while $C_0$ is the transfer coefficient of the attenuation network 14.

Figure 2:
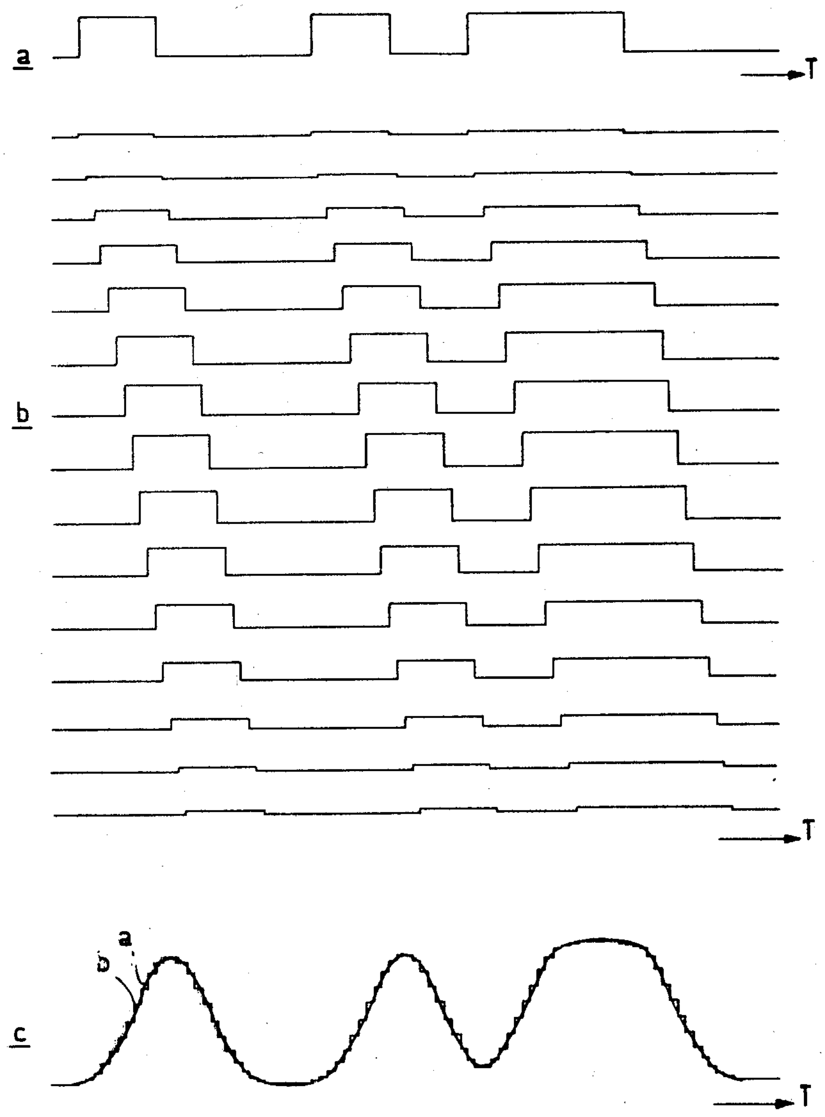
FIGURE 2 shows a few time diagrams.

The operation of the device according to the invention will now be described in greater detail with reference to the time diagrams shown in FIGURE 2, in which FIGURE 2*a* is a bivalent pulse pattern of the pulse generator 1 applied to the device. In the embodiment shown the device used is constructed in the manner as shown in FIGURE 1, in which, however, the number of series-arranged shift register elements is extended to 14 and the number of attenuation networks to 15, while, again starting from the ends of the shift register 3, the attenuation networks are made equal in pairs. More particularly, in the embodiment shown the vaule of the successive transfer coefficients $C_k$ is chosen in accordance with the formula:

$$C_k=\frac{\cos k\pi/5}{2.5\pi(1-0.16k^2}$$

while the shift period $\tau$ of the shift register is made equal to 1/10 of the clock period T.

In the shift register 3, the pulse pattern in the successive shift register elements shown in FIGURE 2*a* is each time shifted over a shift period $\tau$ equal to 1/10 T and through the successive attenuation networks with the associated transfer coefficients applied to the combination device 18. Thus, 15 output voltages appear at the output circuits of the 15 successive attenuation networks, which voltages are shown to scale below one another in the time diagram of FIGURE 2*b*.

The signals shown in FIGURE 2*b* are combined in the combination device 18 and as a result of this combination the signal shown in FIGURE 2*c* is formed which is constructed from a continuously varying enveloping signal *a* and a superimposed steplike curbe *b* which meanders about the enveloping signal *a* in the rhythm of the shift period $\tau$ of the shift register equal to 1/10 of the clock period T.

It can be proved mathematically that in the embodiment shown of the device according to the invention the enveloping signal *a* shown in FIGURE 2*c* corresponds to the output signal of a low pass filter of cosinusoidal pass characteristic having a cutoff frequency $\omega_0$ equal to the clock frequency $\omega_c$ and a linear phase-frequency characteristic if the pulse pattern shown in FIGURE 2*a* is applied to said filter, while in addition the lowest frequency components of the step-like curve *b* are located at a frequency distance of the cutoff frequency of the low pass characteristic of eight times the clock frequency $\omega_c$. Without influencing the shape of the enveloping signal *a*, that is to say, without influencing the shape of the pass characteristic as well as the linear phase-frequency characteristic, the undesired frequency components of the step-like curve *b* which, in fact, are located at least at a frequency distance equal to eight times the clock frequency, can be suppressed by means of a simple suppression filter 19 connected to the output of the combination device 18 in the form of a low pass filter, for example, consisting of a series resistor and a shunt capacitor.

As is shown with reference to the time diagrams shown in FIGURE 2, a filter action is obtained with an analogous amplitude-frequency characteristic by means of a device for bivalent pulse signals constructed in digital techniques, while, as will be apparent hereinafter, the phase-frequency characteristic presents a linear relationship.

For the mathematic approach of the device shown in FIGURE 1 the starting-point is an arbitrary component of angular frequency and amplitude A in the frequency spectrum of the pulses applied to the shift register 3, which component may be written in a complex form as:

$$Ae^{j\omega t} \qquad (1)$$

In the successive shift register elements 4, 5, 6, 7, 8, 9 the respective spectrum component is shifted over time intervals $\tau$, $2\tau$, $3\tau$, $4\tau$, $5\tau$, $6\tau$, which spectrum component shifted over said time intervals may be written mathematically as:

$$Ae^{j\omega(t-\tau)},\ Ae^{j\omega(t-2\tau)},\ Ae^{j\omega(t-3\tau)},\ Ae^{j\omega(t-4\tau)}$$
$$Ae^{j\omega(t-5\tau)},\ Ae^{j\omega(t-6\tau)}$$

Through the relative attenuation networks 11, 12, 13, 14, 15, 16, 17 the transfer coefficients of which are made equal in pairs as described above and are $C_3$, $C_2$, $C_1$, $C_0$, $C_1$, $C_2$ and $C_3$, respectively, this spectrum component is applied to the combination device 18 and thus generates an output signal:

$$C_3Ae^{j\omega t}+C_2Ae^{j\omega(t-\tau)}+C_1Ae^{j\omega(t-2\tau)}+C_0Ae^{j\omega(t-3\tau)}$$
$$+C_1Ae^{j\omega(t-4\tau)}+C_2Ae^{j\omega(t-5\tau)}+C_3Ae^{j\omega(t-6\tau)} \qquad (2)$$

An arbitrary component $Ae^{j\omega t}$ in the frequency spectrum of the pulses applied to the shift register 3 produces an output signal as in Formula 2 so that the transfer characteristic $\varphi(\omega)$ of the filter is:

$$\varphi(\omega)=C_3+C_2e^{-j\omega\tau}+C_1e^{-2j\omega\tau}+C_0e^{-3j\omega\tau}$$
$$+C_1e^{-4j\omega\tau}+C_2e^{-5j\omega\tau}+C_3e^{-6j\omega\tau}$$

Combining the terms with equal transfer coefficients gives:

$$\varphi(\omega)=C_3(1+e^{-6j\omega\tau})+C_2(e^{-j\omega\tau}+e^{-5j\omega\tau})$$
$$+C_1(e^{-2j\omega\tau})+C_0e^{-3j\omega\tau} \qquad (3)$$

or:

$$\varphi(\omega)=C_3e^{-3j\omega\tau}(e^{3j\omega\tau}+e^{-3j\omega\tau})+C_2e^{-3j\omega\tau}(e^{+2j\omega\tau}$$
$$+e^{-2j\omega\tau})+C_1e^{-3j\omega\tau}(e^{+j\omega\tau}+e^{-j\omega\tau})+C_0e^{-3j\omega\tau} \qquad (4)$$

and thus:

$$\varphi(\omega)=(2C_3\cos 3\omega\tau+2C_2\cos 2\omega\tau$$
$$+2C_1\cos\omega\tau+C_0)e^{-3j\omega\tau} \qquad (5)$$

Formula 5 is the transfer characteristic of the device shown in FIGURE 1, the amplitude-frequency characteristic of which is represented by:

$$\psi(\omega)=2C_3\cos 3\omega\tau+2C_2\cos 2\omega\tau+2C_1\cos\omega\tau+C_0$$

while the phase-frequency characteristic exhibits a purely linear relationship since, in fact, it follows from the factor $e^{-3j\omega\tau}$ that the phase varies exactly linearly with the frequency of the components in the spectrum of the bivalent pulse signals applied to the device. If the transfer coefficients $C_3$, $C_2$, $C_1$, $C_0$ vary, the shape of the amplitude-frequency characteristic varies but the linear phase-frequency characteristic is not influenced, that is to say, that the use of the measures according to the invention results in the most remarkable effect that, while maintaining a linear phase-frequency characteristic, an arbitrary amplitude-frequency characteristic $\psi(\omega)$ can be realized by suitable choice of the transfer coefficients $C_3$, $C_2$, $C_1$, $C_0$.

The above considerations can simply be extended to a shift register 3 having an arbitarary number of shift register elements in which the amplitude-frequency characteristic has the form:

$$\psi(\omega)=C_0+\sum_{1}^{N}2C_k\cos k\omega\tau \qquad (6)$$

and the phase-frequency characteristic presents a purely linear relationship.

Thus, for the shape of the amplitude-frequency characteristics a Fourier series appears expanded in the terms $C_k\cos k\omega\tau$, the periodicity $\Omega$ of which is given by the relation:

$$\Omega\tau=2\pi \qquad (7)$$

To realize a particular amplitude-frequency characteristic, the coefficients $C_k$ in the Fourier expansion can simply be calculated mathematically; for example, if a particular amplitude-frequency characteristic $\psi(\omega)$ is desired, the coefficients $C_k$ are given by:

$$C_k=\frac{1}{\Omega}\int_0^{\Omega}\psi(\omega)\cos k\omega\tau d\omega \qquad (8)$$

Knowing the factors $C_k$ the shape of the amplitude-frequency characteristic is fully determined, but the periodic behaviour of the terms $C_k\cos k\omega\tau$ in the Fourier expansion must be considered more in detail. In fact, all the terms $C_k\cos k\omega\tau$ assume the same value each time after the periodicity $\Omega$ which has for its result that the amplitude-frequency characteristic is repeated with the periodicity $\Omega$ as is shown in greater detail in the amplitude-frequency characteristic of FIGURE 3. If, for example, a low pass filter is desired, having the pass region denoted by the curve *c*, the pass region recurs every time after a frequency interval equal to the periodicity $\Omega$ and in this manner the additional pass regions illustrated by the curves *d* and *e* the centres of which are located at a frequency interval $\Omega$ from one another, are obtained. So it is these additional pass regions *d* and *e* within which the frequency components of the step-like curve *b* in FIGURE 2*c* are located.

In practice these additional pass regions *d*, *e* are not disturbing, since, if the value of the periodicity $\Omega$ is sufficiently large, or, which according to Formula 7 comes down to the same, if the value of the shift period $\tau$ is sufficiently small, the frequency distance between the desired pass region *c* and the subsequent additional pass regions *d*, *e* can be made sufficiently large as a result of which these additional pass regions *d*, *e* can be suppressed at the output of the combination device 18 by the particularly simple suppression filter 19 without influencing in any manner the amplitude-frequency characteristic and the linear phase-frequency characteristic in the desired pass region *c*. For example, in the practical embodiment described with reference to the time diagrams of FIGURE 2, the periodicity $\Omega$ was made 10 times larger than the cutoff frequency $\omega_0$ of the desired pass region *c*, in which the suppression filter 19 is constituted by a series resistor and a shunt capacitor.

Before further entering into the practical embodiment described with reference to FIGURE 2, a more detailed embodiment of the device shown in FIGURE 1 will be described with reference to FIGURE 4, in which elements corresponding to those of FIGURE 1, will be denoted by the same reference numerals.

In this device, the combination device is constituted by a resistor 20, while the ends of the shift register elements 4, 5, 6, 7, 8, 9 are connected to the combination device constituted by the resistor 20 through adjustable attenuation resistors 21, 22, 23, 24, 25, 26, 27 which constitute the adjustable attenuation networks together with the resistor 20 of the combination device. If the value of one of the attenuation resistors is $R_k$ and the value of the resistor *r* of the combination device 20 is much smaller than $R_k$, the transfer coefficient is $r/R_k$, since, in fact, the relative adjustable attenuator resistor $R_k$ together with the resistor 20 of the combination device constitute a potentiometer.

At the ends of the shift register elements 4, 5, 6, 7, 8, 9 phase inverter stages 28, 29, 30, 31, 32, 33, 34 are also provided so that phase-inverted pulse signals can be derived from the shift register elements 4, 5, 6, 7, 8, 9, which is of importance to realize negative coefficients $C_k$ in the Fourier expansion according to Formula 8. Actually, in designing a filter having a given amplitude-frequency characteristic, a few coefficients $C_k$ in the Fourier expansion may have a negative value.

The use of this measure provides an essential expansion of the possibilities of application. In fact, if the transfer coefficient associated with the attenuation resistors 21, 22, 23, 24, 25, 26, 27 starting from the extreme shift register elements 4, 9, are made equal in pairs and if these transfer coefficients are $C_3$, $C_2$, $C_1$, respectively, as in FIGURE 1, and if further the transfer coefficient $C_0$ associated with the attenuation resistor 24 is made equal to zero, but if in contrast with the embodiment shown in FIGURE 1 the phase-inverted pulse signal is applied to the attenuation resistors 21, 22, 23, then the transfer characteristic of the network may be written in the manner as described above as:

$$\varphi(\omega)=C_3(e^{3j\omega\tau}-e^{-3j\omega\tau})e^{-3j\omega\tau}+C_2(e^{2j\omega\tau}-C^{-2j\omega\tau})e^{-3j\omega\tau}+C_1(e^{+j\omega\tau}-e^{-j\omega\tau})e^{-3j\omega\tau}$$

or as:

$$\varphi(\omega)=(2C_3\sin 3\omega\tau+2C_2\sin 2\omega\tau+2C_1\sin\omega\tau)\,je^{-3j\omega\tau}$$

Thus the transfer characteristic shows an amplitude-frequency characteristic $\psi(\omega)$ expanded in sine terms and a linear phase characteristic which, according to the phase factor $je^{-3j\omega\tau}$ has the remarkable property that it has a phase shift of $\pi/2$ relative to the linear phase characteristic of the filter shown in FIGURE 1.

The above considerations may again be expanded to an arbitrary number of shift register elements in which the amplitude-frequency characteristic is represented by a Fourier series expanded in sine terms:

$$\Psi(\omega)=\sum_{1}^{N}2C_k\sin k\omega\tau$$

with a periodicity $\Omega$ given by the relation $\Omega\tau=2\pi$, in which the coefficients $C_k$ are given by:

$$C_k=\frac{1}{\Omega}\int_0^{\Omega}\Psi(\omega)\sin k\omega\tau d\omega$$

As in the embodiment show nin FIGURE 1, the phase-frequency characteristic in this case also presents a linear relationship but it is shifted in phase relative to that of FIGURE 1 over $\pi/2$.

For completeness' sake it is noted here that to obtain the phase-inverted pulse signals the use of separate phase inverter stages 28, 29, 30, 31, 32, 33, 34 can be dispensed with. Actually, said phase-inverted pulse signals can immediately be derived from the shift register elements 4, 5, 6, 7, 8, 9 since, in fact, when the shift register elements 4, 5, 6, 7, 8, 9 are constructed as bistable trigger circuits, the phase-inverted pulse signals likewise appear at said bistable trigger circuits.

In addition it is noted that, to obtain a frequency characteristic expanded in sine terms, the phase-inverted pulse signals may also be applied to the resistors 25, 26, 27 instead of to the resistors 21, 22, 23.

With reference to FIGURES 5 to 8 the construction will now be described of the low pass filter already denoted in FIGURE 2 and having a cosinusoidal pass characteristic with cutoff frequency $\omega_0$ which pass region is denoted in FIGURE 5 by the broken-line curve *f*. Mathematically the pass region denoted by the broken-line curve *f* may be written as $$\Psi(\omega)=\cos\frac{\pi}{2}\frac{\omega}{\omega_0}$$

under the constraint that for frequency values outside the pass region, so for $\omega>\omega_0$, the function $\psi(\omega)$ varies as denoted in FIGURE 3.

In agreement with the above explanation the transfer characteristic *f* in Fourier expansion may be written:

$$C_0+\sum_{1}^{N}2C_k\cos k\omega\tau$$

the coefficients $C_k$ of which are given by:

$$C_k=\frac{1}{\Omega}\int_0^{\Omega}\Psi(\omega)\cos k\omega\tau d\omega$$

In order to ensure that the frequency distance between the desired pass region *f* and the additional pass regions has a sufficiently large value, the ratio between the cutoff frequency $\omega_0$ and the periodicity $\Omega$ is made sufficiently large in agreement with the explanation given with reference to FIGURE 3 and, for example, $$\frac{\omega_0}{\Omega}=\frac{1}{10}$$

With this ratio, the coefficients $C_k$ in the Fourier expansion and consequently also the attenuation resistors 21, 22, 23, 24, 25, 26, 27 are fully determined; in particular, for these coefficients $C_k$ the values already stated in the explanation given with reference to FIGURE 2, are found:

$$C_k=\frac{\cos k\pi/5}{2.5\pi(1-0.16k^2)}$$

In order to establish the amplitude-frequency characteristic entirely, another condition is required. Actually, in the embodiment described it is required that the cutoff frequency $\omega_0$ of the pass region is equal to the clock frequency $\omega_c=2\pi f_c$ or $\omega_0=2\omega_c$. Using the condition stated that $\omega_0/\Omega$ is equal to 1/10 and the relation given by Formula 7: $\Omega\tau=2\pi$, for the shift period of the shift register 3 is found that $\tau=1/10f_c$, that is to say that the frequency multiplier 10 which is connected to the clock pulse generator 2 and which forms the control generator of the shift register 3 must have a frequency multiplication factor of 10.

With the transfer coefficients of the attenuation networks $C_k$ calculated above and the value of the shift period $$\tau=\frac{1}{10f_c}$$

of the shift register, the amplitude-frequency characteristic $\psi(\omega)$ can now be recorded. For example, when using 14 shift register elements and 15 attenuation networks, the amplitude-frequency characteristic as denoted in FIGURE 5 by the curve *g* is obtained. If, thus, the pulse pattern shown in FIGURE 2*a* is applied to the realized filter with the amplitude-frequency characteristic and linear phase-frequency characteristic as denoted in FIGURE 5 by the curve *g*, then the enveloping signal *a* in FIGURE 2*c* represents the output signal which substantially corresponds to the output signal of an ideal low pass filter without phase errors and cosinusoidal pass characteristic till the clock frequency $\omega_c$.

The amplitude-frequency characteristic $\psi(\omega)$ can be recorded as such when the number of shift register elements and attenuation networks is increased; for example, the curve *h* in FIGURE 6 denotes the amplitude-frequency characteristic in the case of 24 shift register elements and 25 attenuation networks, while the broken-line curve *f* as in FIGURE 5 shows the ideal cosinusoidal pass characteristic.

In order to illustrate the influence of the increase of the number of shift register elements and attenuation networks more clearly, the frequency characteristics shown by the curves *f, g, h,* in FIGURES 5 and 6 are shown in FIGURE 7 by the corresponding curves *i, j, k* of the attenuation-frequency characteristics measured in db, the attenuation-frequency characteristic expressed in the amplitude-frequency characteristic $\psi(\omega)$ being given by the formula $-20 \log \psi(\omega)$. From the curves *i, j, k* in FIGURE 7 it appears that by increasing the number of shift register elements and attenuation networks together with a better approach of the desired attenuation-frequency characteristic *i*, also the pass lobes *j, k* located beyond the cutoff frequency $\omega_0$ of the pass region are shifted to higher attenuation regions.

As already explained above, it is necessary for the construction of a concrete filter according to the invention to know the two following data, namely first of all the transfer coefficients $C_k$ of the attenuation networks, with which the shape of the amplitude-frequency characteristic is fully determined, for example, in the embodiment described, the cosinusoidal pass characteristic, and, secondly, the shift period $\tau$ dependent upon the clock frequency $\omega_c$ with which in the embodiment described the cutoff frequency was determined; for example, with a shift period $$\tau=\frac{1}{10f_c}$$

the cutoff frequency of the filter was equal to the clock frequency. If the shift period is varied, the cutoff frequency will also vary as a result, while the shape of the amplitude-frequency characteristic and the linear phase characteristic are maintained.

If, for example, pulses having a different clock frequency $\omega_b$ are applied to the device shown in FIGURE 1 or FIGURE 4, but the multiplication factor of the frequency multiplier is kept equal to 10, the cutoff frequency of the filter will follow the clock frequency and remain equal to the varied clock frequency $\omega_b$. Consequently, if the clock frequency varies from 2000 c./s. to 100 c./s., also the cutoff frequency varies from 2000 c./s. to 100 c./s.

If, on the contrary, in the devices shown in FIGURE 1 or FIGURE 4, the multiplication factor of the frequency multiplier 10 is varied, with the clock frequency $\omega_c$ remaining the same, the cutoff frequency will vary relative to the clock frequency. For example, if the frequency multiplier 10 is made adjustable and the multiplication factor is varied from 10 to 5, the cutoff frequency of the filter varies from the clock frequency to half the clock frequency.

In addition to the convenient structure of the filter according to the invention in which arbitrary amplitude-frequency characteristics can be realized with linear phase-frequency characteristics, the present filter is distinguished by its particularly simple adjustability, in tioned as an example, a low pass filter having a cosinusoidal pass characteristic and linear phase-frequency characteristic, the filter can be adapted to the relative use. The new conception of the filter according to the invention has for its result that now filters can be designed for bivalent pulse signals which so far have resulted in impossible constructions, in which may be mentioned as an example, a low pass filter having a cosinusoidal pass characteristic and linear phase-frequency characteristic, the cutoff frequency of which must be adjustable from several mc./s. to a few tenths of a c./s.

Considering in addition that with the filter according to the invention arbitrary transfer characteristics and consequently in addition to low pass filters also filters of a different type can be realized, for example, high pass filters, stop filters, band filters, comb filters, and so on, it may no doubt be said here that by using the measures according to the invention new technical fields are opened.

FIGURE 8 shows a variant of a device according to the invention, in which elements corresponding to those of FIGURE 4 are denoted by the same reference numerals.

This device differs from the device shown in FIGURE 4, in the construction of the shift register 3. In this embodiment the shift registers 3 consists of shift register elements 35, 36, 37, 38, 39, 40 included in parallel arrangement which shift the pulse signals applied to them over time intervals which mutually differ by the shift period $\tau$. In this embodiment the shift register elements 35, 36, 37, 38, 39, 40 are again connected, through attenuation resistors 21, 22, 23, 24, 25, 26, 27, to a combination device constituted by a resistor 20, from which the output signal of the device is derived through a suppression filter 19. If desired, phase inverter stages may be connected to the shift register elements 35, 36, 37, 38, 39, 40, but these are not shown to avoid drawing complexity.

In quite the same manner as described above, arbitrary transfer characteristics can be realized in this embodiment also by suitable proportioning of the attenuation resistors 21, 22, 23, 24, 25, 26, 27.

However, the constructions of the devices shown in FIGURE 1 and FIGURE 4 are to be preferred since in these embodiments the number of component parts is considerably reduced. The construction of the shift register elements for bivalent pulse signals can be realized particularly simply, for example, as already described above, by using bistable trigger circuits composed with resistors and capacitors which construction is particularly suitable for integrated circuits as a result of which the device according to the invention can be incorporated in a space of a few ccms. If required the attenuation networks also may be constructed as integrated circuits.

FIGURE 9 shows a particularly elegant use of the filter according to the invention, consisting in the use for transmission of bivalent pulses by means of single sideband modulation in the manner as already described in prior patent application Ser. No. 532,744, filed Mar. 8, 1966 (Dutch patent application 6503571) in which, however, the production of the single sideband signal is effected in a different manner. For this application a sinusoidal frequency characteristic was desired of the form shown in FIGURE 10, in which the direct current term is suppressed and the upper cutoff frequency $\omega_0$ is equal to the clock frequency while the phase characteristic must present a purely linear relationship.

In this device, as in the preceding examples, the bivalent pulses generated by the pulse generator 1, the instants of occurrence of which are determined by a fixed clock frequency, are applied to a shift register 3 with shift register elements 4, 5, 6, 7, 8, 9, while the control generator of the shift register 3 is formed by a frequency multiplier 10 connected to a clock pulse generator. Phase inverter stages 28, 29, 30, 31, 32, 33, 34 are also connected to the shift register elements 4, 5, 6, 7, 8, 9.

To realize the frequency characteristics shown in FIGURE 10, bivalent pulses derived from the shift register elements 4, 5, 6, 7, 8, 9 are applied to a combination device constituted by a resistor 20 through attenuation resistors 21, 22, 23, 24, 25, 26, 27, a suppression filter 19 being connected to the output of the combination device. Starting from the ends of the shift register 3, the attenuation resistors 21, 27; 22, 26; 23, 25 are made equal in pairs and the pulse signals of equal polarity are each time applied to the mutually equal attenuation resistors 21, 27; 22, 26; 23, 25, as a result of which, as explained above a transfer characteristic is obtained having a frequency characteristic expanded in cosine terms of the form:

$$\psi(\omega)=C_o+\sum_{1}^{n}2C_k\cos k\omega\tau$$

and a linear phase-frequency characteristic.

In the device shown the shift register elements 4, 5, 6, 7, 8, 9 are also connected to a combination constituted by a resistor 48 through a second series of attenuation resistors 41, 42, 43, 44, 45, 46, 47, the combination device being succeeded by a suppression filter 49. In this second series of attenuation resistors 41, 42, 43, 44, 45, 46, 47 also the attenuation resistors 41, 47; 42, 46; 43, 45 are made equal in pairs starting from the ends of the shift register 3, but pulse signals of opposite polarity are applied to the mutually equal attenuation resistors 41, 47; 42, 46; 43, 45, so that, as explained above, a transfer characteristic is obtained having an amplitude-frequency characteristic expanded in sine terms of the form:

$$\psi(\omega)=\sum_{1}^{n}2C_k\sin k\omega\tau$$

while the phase-frequency characteristic is linear.

When the attenuation resistors 21–27; 41–47 and the shift period $\tau$ are suitably proportioned, amplitude-frequency characteristics corresponding to the ideal amplitude-frequency characteristic in FIGURE 10 are obtained both for the amplitude-frequency characteristic expanded in sine terms and in cosine terms.

If thus a pulse signal is applied to the shift register 3, a pulse signal is derived from each of the suppression filters 19, 49, which both signals have traversed the amplitude-frequnecy characteristic shown in FIGURE 10, but have experienced mutually a phase shift of $\pi/2$ since, as was explained above, the two transfer characteristics show a mutual phase shift of $\pi/2$.

For a single sideband modulation these output signals which are mutually shifted in phase over $\pi/2$ and are derived from the suppression filters 19, 49 may advantageously be used; actually, these signals are applied for that purpose to two push-pull modulators 50, 51, in particular ring modulators, to which are also applied carrier wave oscillations of a common carrier wave oscillator 53 which are shifted in phase mutually over $\pi/2$ while using a phase shifting network. If the output signals of the two push-pull modulators 50, 51 are combined in a combination device 54, one of the sidebands produced by modulation is omitted as a result of which a single sideband signal is formed which is applied for further transmission to a transmission line 56 with the interconnection, if desired, of a band-filter 55 to suppress the udesired modulation products produced in the modulation. The carrier wave oscillation is also applied as a pilot signal to the transmission line 56, through an attenuating network 57 connected to the carrier wave oscillator 53, which pilot signal serves for the accurate recovery of the carrier wave oscillation at the receiver end.

It is pointed out that in the practical embodiment the shift register comprises 10 shift register elements.

It is to be noted here that, instead of constructing the filter according to the invention with an even number of shift register elements and an odd umber of atteuation networks, it may, naturally, also be constructed with an odd number of shift register elements and an even number of attenuation networks. If the same amplitude-frequency characteristic is constructed using an even number of shift register elements, for example, 14, and using an odd number of shift register elements, for example 13, and if the signals thus obtained are combined with the interconnection of a suitable delaying network, it is found that the sigal components in the next additional pass region neutralize one another.

In addition, the combination device in the embodiment described may be constituted by a difference producer, instead of by an adder. Finally, it is noted that it is not necessary in the device according to the invention to realize a linear phase-frequency characteristic; for example, that in addition to the described filter action in the pass region phase equalization may be effected, in which a phase deviation compensating for the occurring phase error is produced.

What is claimed is:

1. A filter for bivalent pulse signals comprising a clock pulse generator, a source of said signals synchronized with said clock pulse generator, a shift register having a plurality of shift register elements, each of said elements having an output circuit, means for applying said signals to said shift register, a source of control pulses having a frequency, a multiple of said clock frequency and synchronized therewith and connected to said shift register, said control pulses having a period less than the minimum duration of the pulses of said pulse signals, whereby said pulse signals are successively delayed at said output circuits, separate attenuator means connected to each output circuit, and means for combining the outputs of said attenuator means to produce a filtered version of said pulse signals.

2. The filter of claim 1 wherein said source of control pulses comprises a frequency multiplier means connected to said clock pulses generator, whereby the period of said control pulses is a sub-multiple of the period of said pulse signals.

3. The filter of claim 1 wherein said shift register elements are serially connected in said shift register.

4. The filter of claim 1 wherein said attenuator means are variable.

5. The filter of claim 1 comprising low pass suppression filter means connected to said combining means for suppressing frequency components in the output of said combining means above a predetermined frequency.

6. The filter of claim 1 in which said combining means is a resistor having one end connected to a point of reference potential, and said attenuator means are connected to the other end of said resistor.

7. The filter of claim 1 comprising means for inverting the phase of the signals applied by at least one attenuator means to said combining means.

8. The filter of claim 1 in which the attenuation of each attenuator means, counting from one end of said shift register, is equal to the attenuation of the attenuator means the same number of elements from the other end of said shift register and different from the remaining attenuation means.

9. The filter of claim 1 comprising a second combining means, and additional separate attenuator means for connecting said second combining means to the output circuits of said shift register elements, whereby the output of said second combining means is also a filtered version of said pulse signals.

10. The filter of claim 1 comprising an additional set of separate attenuator means connected to the output circuits of shift register elements of said shift register means, and second combining means for combining the outputs of said additional attenuator means to produce a second filtered version of said pulse signals, said second version being substantially in phase quadrature with said first version, both versions being filtered according to a same amplitude versus frequency characteristic having a spectral null at zero frequency.

11. The filter of claim 10 in which in both sets of separate attenuator means the attenuation of each attenuator means, counting from one end of said shift register means, is equal to the attenuation of the attenuator means the same number of elements from the other end of said shift register means, said pulse signals being applied in phase to both attenuator means of each pair of said attenuator means of equal attenuation in one said set, and in opposite phase to the attenuation means of each pair of said attenuator means of equal attenuation in the other said set.

12. The filter of claim 10 comprising a first and a second push-pull modulator, means connecting the output of said first and second combining means to said first and second push-pull modulator respectively, a source of carrier wave oscillations, means for supplying said carrier wave oscillations in phase quadrature to said first and second push-pull modulators, and third combining means for combining the outputs of said first and second push-pull modulators to produce a filtered single sideband modulated version of said pulse signals.

References Cited

UNITED STATES PATENTS

| | | | |
|---|---|---|---|
| 3,249,879 | 5/1966 | Ward et al. | 328—60 X |
| 3,297,951 | 1/1967 | Blasbalg | 328—61 X |
| 3,323,068 | 5/1967 | Woods | 328—61 X |

JOHN S. HEYMAN, Primary Examiner

R. C. WOODBRIDGE, Assistant Examiner

U.S. Cl. X.R.

307—221; 328—60, 63

UNITED STATES PATENT AND TRADEMARK OFFICE

CERTIFICATE OF CORRECTION

PATENT NO. : 3,500,215

DATED : March 10, 1970

INVENTOR(S) : PETER LEUTHOLD ET AL

It is certified that error appears in the above-identified patent and that said Letters Patent are hereby corrected as shown below:

IN THE SPECIFICATION

Column 1, line 40, cancel "to";

line 69, after "invention" and before ";" it should read --while--;

line 70, cancel ";";

Column 2, line 10, after "a" it should read --,--;

line 11, ";" should read --,--;

Column 6, line 13, "show nin" should read --shown in--;

Column 7, line 39, "db" should be --dB--;

UNITED STATES PATENT AND TRADEMARK OFFICE

CERTIFICATE OF CORRECTION

PATENT NO. : 3,500,215

DATED : March 10, 1970

INVENTOR(S) : PETER LEUTHOLD ET AL

It is certified that error appears in the above-identified patent and that said Letters Patent are hereby corrected as shown below:

Column 8, lines 10 to 25, it should read as follows:

--In addition to the convenient structure of the filter according to the invention in which arbitrary amplitude-frequency characteristics can be realized with linear phase-frequency characteristics, the present filter is distinguished by its particularly simple adjustability, in which, while maintaining the shape of the amplitude-frequency characteristic and the linear phase-frequency characteristic, the filter can be adapted to the relative use. The new conception of the filter according to the

UNITED STATES PATENT AND TRADEMARK OFFICE

CERTIFICATE OF CORRECTION

PATENT NO. : 3,500,215
DATED : March 10, 1970
INVENTOR(S) : PETER LEUTHOLD ET AL It is certified that error appears in the above-identified patent and that said Letters Patent are hereby corrected as shown below:

invention has for its results that now filters can be designed for bivalent pulse signals which so far have resulted in impossible constructions, in which may be mentioned as an example, a low pass filter having a cosinusoidal pass characteristic and linear phase-frequency characteristic, the cutoff frequency of which must be adjustable from several mc/s to a few tenths of a c/s.--

Column 10, line 25, "sigal" should be --signal--.

Signed and Sealed this

Twenty-second Day of March 1977

[SEAL]

*Attest:*

RUTH C. MASON
*Attesting Officer*

C. MARSHALL DANN
*Commissioner of Patents and Trademarks*